United States Patent
Sadana et al.

(10) Patent No.: US 12,221,863 B2
(45) Date of Patent: Feb. 11, 2025

(54) FILTRATION OF FLUIDS USING CONFORMABLE POROUS SHAPE MEMORY MEDIA

(71) Applicants: Anil Sadana, Houston, TX (US); Devesh Agrawal, Houston, TX (US)

(72) Inventors: Anil Sadana, Houston, TX (US); Devesh Agrawal, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 983 days.

(21) Appl. No.: 16/918,524

(22) Filed: Jul. 1, 2020

(65) Prior Publication Data
US 2022/0003083 A1    Jan. 6, 2022

(51) Int. Cl.
*E21B 43/08* (2006.01)
*B01D 35/02* (2006.01)
*B01D 39/12* (2006.01)
*B01D 39/16* (2006.01)

(52) U.S. Cl.
CPC .......... *E21B 43/082* (2013.01); *B01D 35/02* (2013.01); *B01D 39/12* (2013.01); *B01D 39/1676* (2013.01); *B01D 2201/04* (2013.01); *B01D 2239/0291* (2013.01); *B01D 2239/1208* (2013.01)

(58) Field of Classification Search
CPC ... E21B 43/082; B01D 35/02; B01D 39/1676; B01D 2239/0291; B01D 2239/0407; B01D 2239/0428
See application file for complete search history.

(56) References Cited

U.S. PATENT DOCUMENTS

| | | | | |
|---|---|---|---|---|
| 7,743,835 | B2* | 6/2010 | Willauer | C08K 3/08 977/773 |
| 8,960,314 | B2* | 2/2015 | Ramon | E21B 33/12 166/387 |
| 2011/0232901 | A1* | 9/2011 | Carrejo | E21B 43/108 166/227 |
| 2015/0284542 | A1* | 10/2015 | Roy | C08L 81/04 524/493 |
| 2016/0186533 | A1* | 6/2016 | Donzier | E21B 43/01 702/6 |

OTHER PUBLICATIONS

Notification Concerning Transmittal of International Preliminary Report on Patentability for PCT/US2021/070794 dated Dec. 13, 2022, 7 pages.

* cited by examiner

*Primary Examiner* — Tara Schimpf
*Assistant Examiner* — Jennifer A Railey
(74) *Attorney, Agent, or Firm* — CANTOR COLBURN LLP

(57) ABSTRACT

A fluid control device includes a support structure configured to be deployed in a borehole, and a filtration component disposed at the support structure, the filtration component including a porous medium made from a thermoplastic polymer material, the porous medium including an open cell foam. The porous medium has a porosity selected to cause the porous medium to exhibit shape memory behavior, and the porous medium is configured to be compacted from an initial shape to a compacted shape, deployed in the borehole, and subsequently expanded due to a downhole temperature to conform to a surface of the borehole.

20 Claims, 4 Drawing Sheets

FILTRATION OF FLUIDS USING CONFORMABLE POROUS SHAPE MEMORY MEDIA

BACKGROUND

Various tools are utilized in subterranean operations, such as hydrocarbon exploration, drilling and completion operations, to increase or maximize production efficiency. Sand control devices such as sand screens are utilized to control the ingress of particulate contaminants into production fluid and to aid in stabilizing production formations. Examples of sand control devices include screen assemblies having conformable sleeves or components that are expanded downhole. In some cases, high temperature conditions experienced downhole can affect the performance such sand control devices.

BRIEF DESCRIPTION OF THE INVENTION

An embodiment of a fluid control device includes a support structure configured to be deployed in a borehole, and a filtration component disposed at the support structure, the filtration component including a porous medium made from a thermoplastic polymer material, the porous medium including an open cell foam. The porous medium has a porosity selected to cause the porous medium to exhibit shape memory behavior, and the porous medium is configured to be compacted from an initial shape to a compacted shape, deployed in the borehole, and subsequently expanded due to a downhole temperature to conform to a surface of the borehole.

An embodiment of a fluid control method includes deploying a fluid control device in a borehole, the fluid control device including a support structure and a filtration component disposed at the support structure, the filtration component including a porous medium made from a thermoplastic polymer material, the porous medium including an open cell foam. The porous medium has a porosity selected to cause the porous medium to exhibit shape memory behavior, where the fluid control device is deployed when the porous medium is in a compacted shape. The method also includes activating the porous medium to cause the porous medium to expand due to a downhole temperature, and conform to a surface of the borehole, and flowing a fluid through the porous medium and filtering undesirable material from the fluid.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Devices, systems and methods for controlling sand and other undesirable material in a downhole environment are described herein. An embodiment of a fluid control device or tool includes a screen assembly having a porous medium made from a high temperature thermoplastic polymer. The thermoplastic polymer is formed as a foam or other porous medium and acts to filter fluid entering the fluid control device, e.g., production fluid including formation fluids such as oil and hydrocarbon gas. The porosity of the thermoplastic polymer imparts a shape memory characteristic to the porous medium, which allows the porous medium to be compressed into a run-in shape and size, and expanded downhole to conform to a borehole or otherwise expand so that sand, particulates and other undesirable material is filtered from production fluid.

In one embodiment, the porous medium is formed as an open cell foam that at least partially surrounds a base pipe or other support structure. Fluid entering a borehole from a subterranean region into an annulus flows through the porous medium and into a fluid conduit in fluid communication with the surface, while sand and other particulates, as well as larger solids, are prevented from entering the fluid conduit. The screen assembly may include one or more layers of the porous medium, either alone or in combination with one or more additional filtration layers or devices, such as perforated sleeves, wire mesh, bead screens and/or others.

Embodiments described herein present a number of advantages. The filtration assemblies and screen assemblies described herein can be used in higher temperature environments than conventional screens and conventional shape memory devices. The assemblies can withstand such higher temperatures without significantly degrading, and can be configured to expand at various selected temperatures, thereby providing a robust and effective tool that can be used in a variety of environments encountered downhole.

Figure 1:
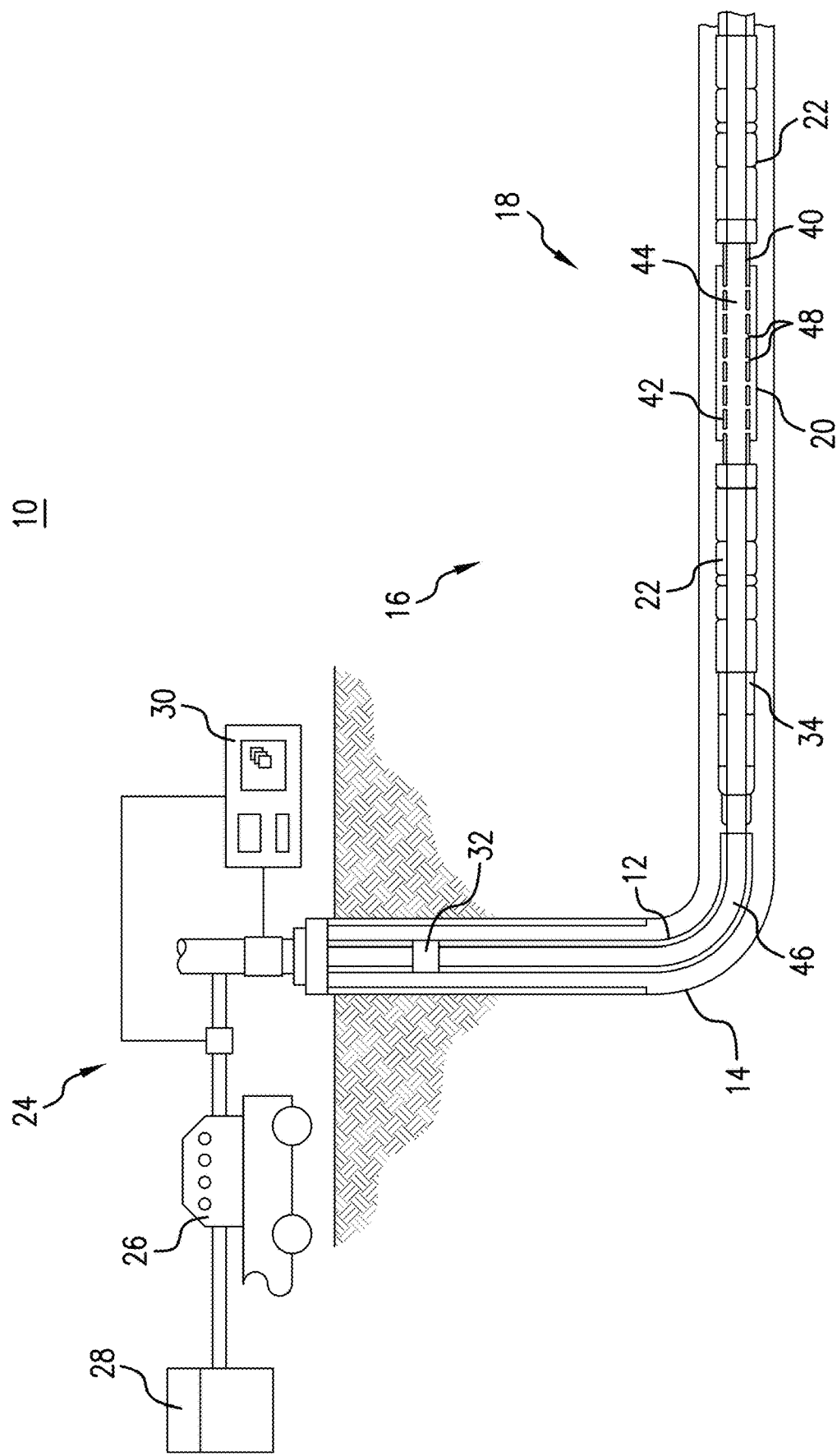
FIG. 1 depicts an embodiment of a downhole completion and/or production system including an expandable and conformable screen assembly.

FIG. 1 depicts an example of a system 10 configured to perform a subterranean operation, and illustrates an example of a screen assembly including a conformable and expandable porous thermoplastic medium. The system 10 in this example is a resource or energy production system 10 that includes a borehole string 12 disposed in a borehole 14 extending into a subterranean region or a resource bearing formation, such as an earth formation 16. It is noted that the porous medium is not limited to this example, and can be incorporated into any suitable downhole device or component.

The borehole string 12 includes a completion string having a production assembly 18. The production assembly 18 includes a screen assembly 20, and may also include a flow control device such as an inflow control device (ICD). The production assembly 18 may include additional components, such as one or more packer assemblies 22 configured to isolate components and/or zones in the borehole 12.

The system 10 also includes surface equipment 24 such as a drill rig, rotary table, top drive, blowout preventer and/or others to facilitate deploying the borehole string 12, operating various downhole components, monitoring downhole conditions and controlling fluid circulation through the borehole 14 and the borehole string 12. For example, the surface equipment 24 may include a fluid control system 26 including one or more pumps in fluid communication with a fluid tank 28 or other fluid source. The fluid control system 26 facilitates injection of fluids, drilling fluid (e.g., drilling mud), stimulation fluid (e.g., a hydraulic fracturing fluid), gravel slurries, proppant, and others. The fluid control system 26 or other suitable system may be used to inject a fluid (referred to as an activation fluid) to trigger shape memory recovery as discussed in more detail below.

One or more components of the borehole string 12 may be configured to communicate with a surface location (e.g., the surface equipment 24). The communication may be wired or wireless. A processing device such as a surface processing unit 30 and/or a subsurface processing unit 32 and/or 34, which may be disposed in the borehole 14 and connected to one or more downhole components. The processing device may be configured to perform functions such as controlling downhole components, transmitting and receiving data, processing measurement data and/or monitoring operations. The processing device may also control aspects of fluid circulation and injection, such as controlling injection of a triggering fluid.

The screen assembly 20 in this embodiment includes a base pipe 40 and an expandable porous medium 42 made from a thermoplastic material. The medium is manufactured to have properties that result in shape memory functionality. In one embodiment, the thermoplastic material is configured to form a foam or other porous medium having a selected porosity, which has been found to impart shape memory behavior. This behavior allows the medium to be compressed or compacted into a compacted or run-in shape, and expanded due to downhole temperatures to an expanded shape. In the embodiment of FIG. 1, the medium 42 is configured to expand to a size or diameter sufficient to contact and conform to an annular region of the borehole 14. In one embodiment, the porosity is selected, designed and/or formed to have a porosity of greater than or equal to about 40%. Embodiments are not so limited, as the medium can have any suitable porosity.

The base pipe 40 defines an inner fluid conduit 44 that can be connected to a borehole string or otherwise in fluid communication with a selected location such as a surface location. For example, the inner fluid 44 is in fluid communication with a production conduit 46 connected to the surface. A plurality of holes or other fluid passages 48 provide fluid paths for fluid entering through the porous medium 42 to flow through the base pipe 40 and into the inner fluid conduit 44.

As noted above, the porous medium is made from a thermoplastic polymer. A thermoplastic polymer is a plastic polymer that becomes moldable or pliable at temperatures exceeding some threshold temperature, and returns to a solidified state after the temperature is reduced. Examples of thermoplastic polymers that may be used to make the porous medium 42 include acrylates, nylon, polypropylene, polyesters, epoxies and others.

The porosity of the thermoplastic porous medium 42 provides for a shape memory effect, in which the medium 42 can be compacted from an initial shape, and later activated by heating the medium 42 to a temperature above a glass transition temperature (Tg), to partially or fully recover the initial shape. For example, the medium 42 is compacted at a temperature above the glass transition temperature, and subsequently cooled to retain the compact shape (run-in shape). The screen assembly 20 can then be deployed in the borehole 12. When the screen assembly 20 reaches a temperature greater than the Tg, the porous medium 42 expands to recover all or some of the initial shape.

The porous medium 42, in one embodiment is made from a thermoplastic polymer (alone or in combination with other materials) that can be deployed in high downhole temperature environments, e.g., up to at least about 300 degrees F.

In one embodiment, a "high temperature" is a temperature that is at or above a downhole or subterranean temperature. In one embodiment, the temperature is at least about 100 degrees C. For example, the high temperature thermoplastic is a material selected or configured to withstand temperatures of at least about 250 degrees F. or 120 degrees C. The high temperature resistance of the polymer, combined with shape memory properties due to (at least) the porosity, results in a medium that can be used in higher temperature environments as compared to conventional screens and conventional shape memory polymers.

The porous medium 42 can be a single layer or multiple layers. In addition, the porous medium can be made from one type of thermoplastic (e.g., polytetrafluoroethylene) or multiple types (e.g., polytetrafluoroethylene and polyether ether ketone).

The porous medium 42 may be part of a screen device or assembly that includes additional layers or filtration components. For example, the screen assembly 20 may be made from one or more layers of the porous medium 42, in combination with one or more additional filtration elements or layers, such as metal screens, wire mesh, polymeric screens, mesh wool, bead screens, perforated sleeves and/or others.

In one embodiment, the porous medium is made from a porous polytetrafluoroethylene (PTFE) material. PTFE is a synthetic fluoropolymer of tetrafluoroethylene, which is a versatile material due to its excellent chemical inertness, outstanding weathering, high temperature resistance, excellent electrical insulation, low co-efficient of friction and hydrophobic properties. These unique properties allow PTFE to be used in diverse range of domestic and industrial applications. PTFE also exhibits resistance to high temperatures, having a melting point of about 327 degrees C. or 620 degrees F.

PEEK is a robust thermoplastics material that has excellent mechanical and chemical resistance properties that are retained even at high temperatures. PEEK melts at about 343 degrees C. or 662 degrees F., and porous PEEK has a glass transition temperature of around 143 degrees C. or 289 degrees F.). PEEK is highly resistant to thermal degradation, as well as to attack by both organic and aqueous environments. PEEK material thermal and mechanical properties can be further enhanced by crosslinking to allow its use in even higher temperatures.

In one embodiment, the thermoplastic polymer is a cross-linked polymer. Cross-linked polymers can provide additional mechanical strength and/or resistance to higher temperatures, which can provide for effective shape memory properties at higher temperatures and/or greater expansion. Cross-linked thermoplastic polymers, such as cross-linked PTFE, have been found to improve both strength and shape rebound. Other types of thermoplastic polymers that can be used include chemically modified polymers (e.g., chemically modified PTFE and/or chemically modified PEEK), other cross-linked polymers (e.g., cross-linked PEEK), and polymers having a filler incorporated therein (e.g., carbon fiber and/or carbon nanotubes).

In one embodiment, the porous thermoplastic medium 42 is configured to be expanded via an activation fluid. The activation fluid acts to reduce the glass transition temperature of the medium to a temperature that is at or below the temperature of a downhole environment. For example, the activation fluid is configured to reduce the glass transition temperature to below about 250-300 degrees F., or other temperature level or range encountered downhole. The activation fluid is selected based on considerations including downhole temperature and desired transition temperature.

The ability to lower the transition temperature downhole allows for the porous medium to be compacted at higher temperatures, which may allow for more compaction. A suitable activation fluid can reduce glass transition temperature so that the more compaction on the surface can be done at higher temperature while achieving expansion at lower glass transition temperature downhole.

The activation fluid may be a water based fluid, such as a brine or water based drilling mud, or an oil based fluid. The fluid is configured to activate the medium 42 and expand it by lowering the Tg temporarily so that downhole temperature causes expansion. The activation fluid may also trigger and/or facilitate expansion due to the activation fluid seeping into pores in the compacted foam and forcing expansion from within the pores. Various chemical additives may be included to control aspects of activation, including activation temperature and the rate of expansion.

Although embodiments are discussed in the context of sand control and as part of the system 10, it is to be understood that the embodiments are not so limited. The medium 42 may be configured for any desired downhole application (or surface application) and thus have any suitable shape, size, material composition and chemical composition.

Figure 2:
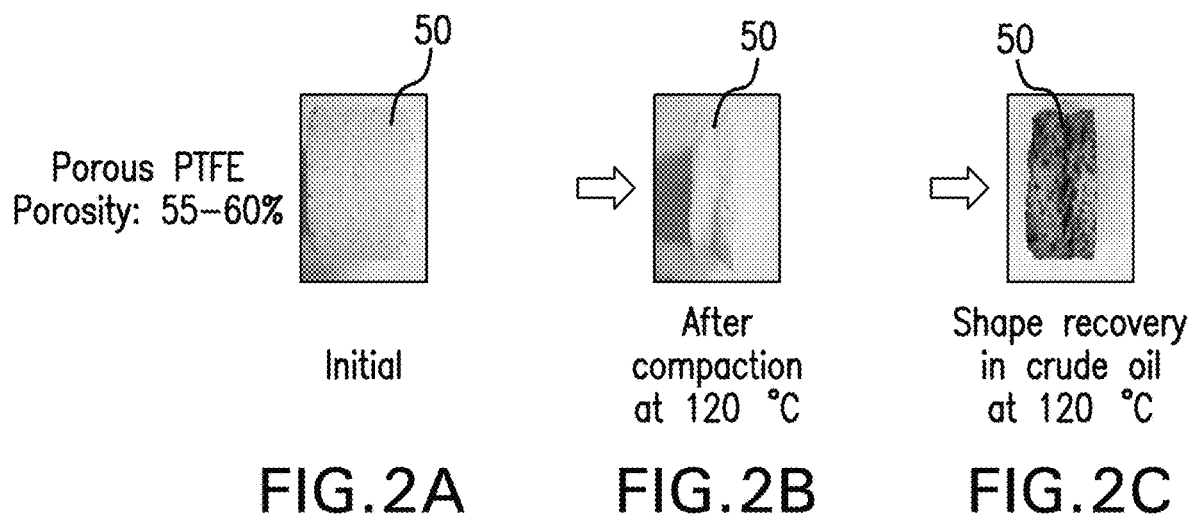
FIGS. 2A-2C (collectively referred to as FIG. 2) depict an example of a conformable porous medium that can be incorporated into a downhole component such as the screen assembly of FIG. 1.

FIGS. 2A-2C depict an example of a porous medium 50 made from a thermoplastic polymer. In this example, the porous medium 50 is an open cell foam made from PTFE, and is formed as a cylinder. It is noted that the porous medium 50 may take any form that provides fluid paths that allow fluid to enter a production conduit or other location. Examples of such forms include closed cell foam, foam having both open and closed cells, a lattice, interleaved fibers or other elongated members, perforated plates or sleeves, and others.

FIGS. 2A-2C show the porous medium 50 in various states. As shown in FIG. 2A, the porous medium was initially manufactured as a foam having a porosity of about 55-60%. At this point, the porous medium is in an initial state and has an initial width of about 0.55 to about 0.61 inches. Referring to FIG. 2B, the foam is compacted under a temperature that is greater than the transition temperature Tg, and allowed to cool. In this example, the temperature during the compaction phase is greater than about 120 degrees C. The foam is now in a compacted state, and has a width of about 0.35 to about 0.40 inches.

The foam was then deployed in an environment having crude oil and a temperature above the transition temperature (e.g., 120 degrees C.). At this temperature, the foam expanded to a width of about 0.42 to about 0.52 inches, which represents good shape memory recovery of about 76-85%. The shape recovery can be improved further by optimizing the porosity of the material and/or by improving the properties of the PTFE material by way of crosslinking, adding fillers and/or chemically modifying the PTFE.

The porous medium 50 can be manufactured in a number of ways. One example is a sacrificial method in which the thermoplastic material (e.g., PTFE) is processed to create a selected porosity by mixing or blending the thermoplastic material with a sacrificial filler. Porosity is created by subsequently dissolving or otherwise removing the filler to create pores. Another example involves heating the material to a liquid or pliable state and blowing air or other gases to create bubbles or voids. In yet another example, glass spheres or other hollow bodies are blended with the thermoplastic material, followed by solidification and application of a compressive force to break the hollow bodies.

Figure 3:
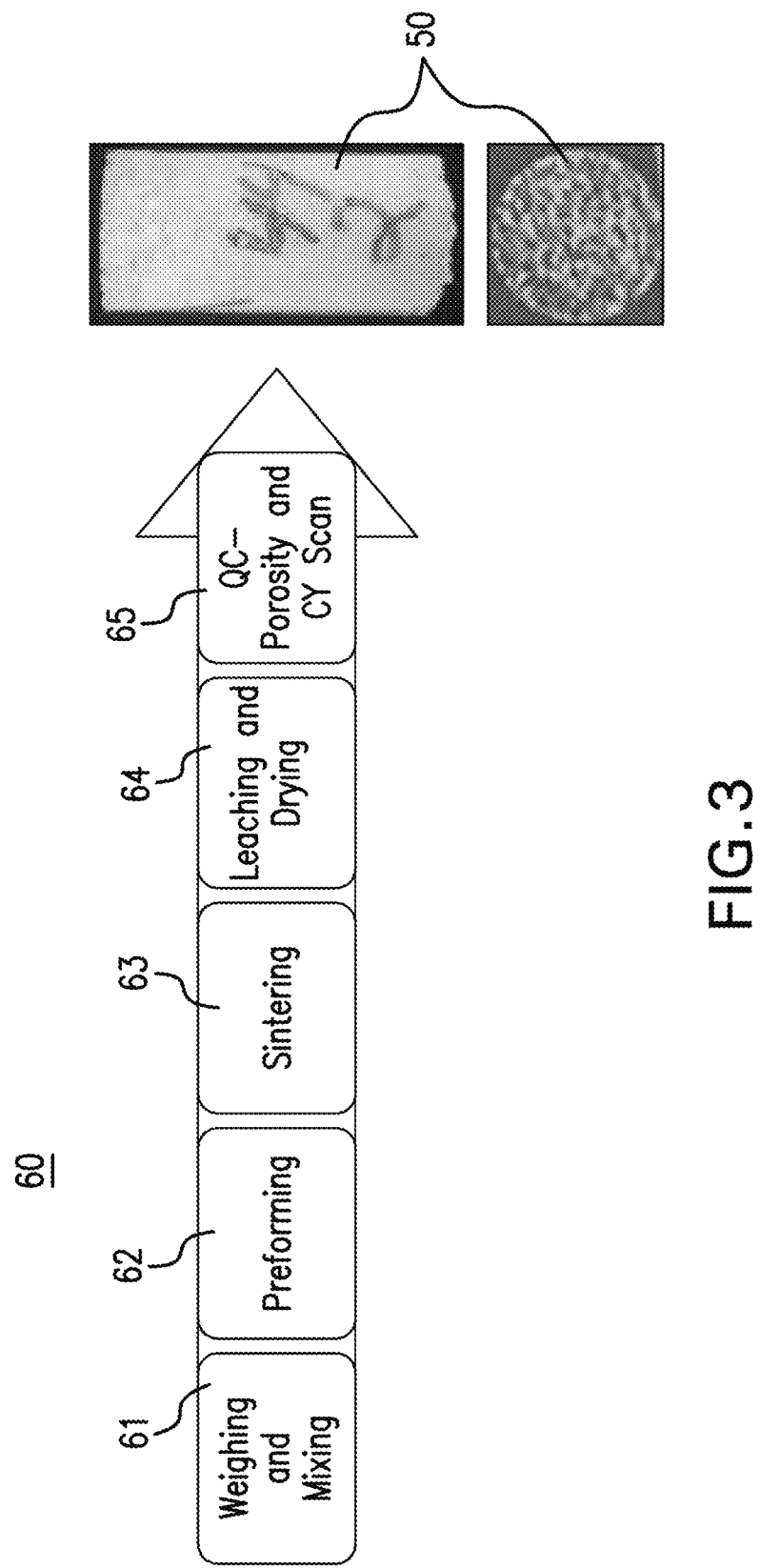
FIG. 3 is a flow diagram depicting an embodiment of a method of manufacturing a conformable porous medium and/or a fluid control device.
Figure 4:
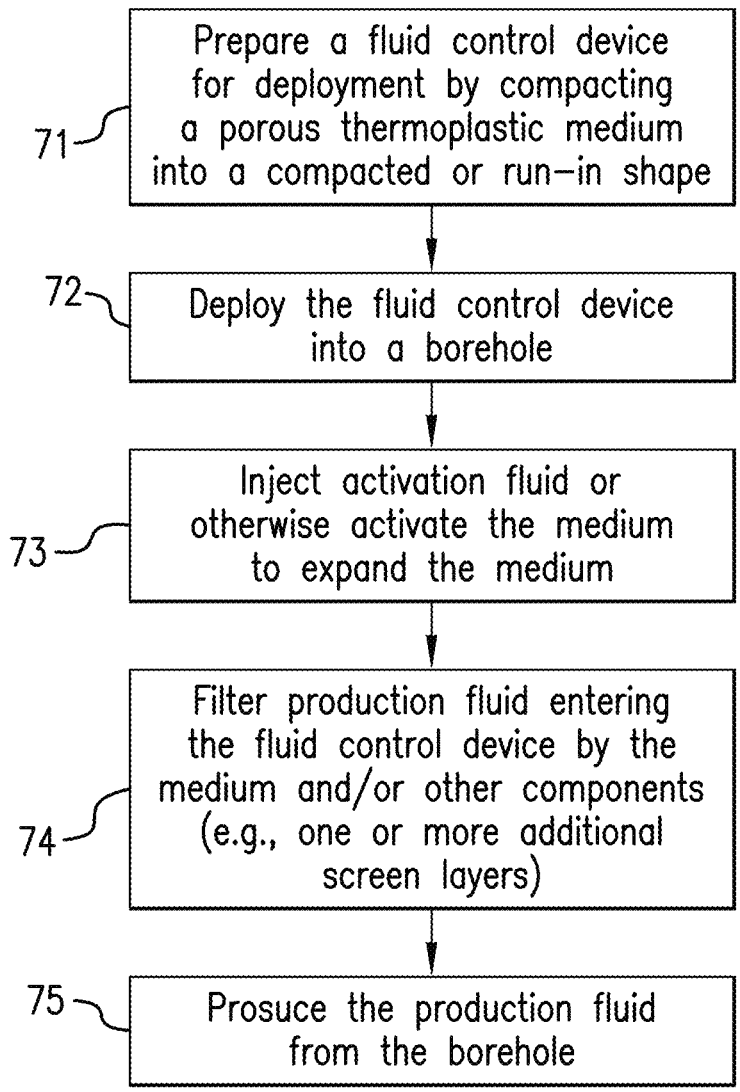
FIG. 4 is a flow diagram depicting a method of controlling fluid flow in a borehole, and/or performing aspects of a downhole or subterranean operation.

FIG. 3 depicts an embodiment of a method 60 of manufacturing a porous thermoplastic medium, such as the porous medium 50 and/or 40. The method 60 includes one or more stages 61-65. In one embodiment, the method 60 includes the execution of all of stages 61-65 in the order described. However, certain stages may be omitted, stages may be added, or the order of the stages changed.

At stage 61, powdered thermoplastic material (e.g., PTFE) or beads of the thermoplastic material are mixed with a dissolvable substance such as a salt. The salt may be in a particulate form, and the size of the particles may be selected based on the desired pore size or porosity. In addition, the ratio between the amount of the thermoplastic material and the amount of salt can be selected based on the desired porosity. For example, powdered PTFE and powdered salt are mixed with a proportion of about 60% salt (e.g., 30 g) and about 40% PTFE (e.g., 20 g).

At stage 62, the mixture is preformed to a desired shape, such as a hollow cylindrical shape configured to be disposed on a base pipe. At stage 63, the mixture is fused and sintered together at a suitably high temperature to create an integrated body.

At stage 64, the salts are then extracted from the integrated body. For example, the salt is extracted and dissolved by use of water at elevated temperature under pressure, leaving a porous thermoplastic medium. Additional quality control and inspection tests may be performed at stage 65. The resulting porous medium has a porosity of about 55 to about 60%.

FIG. 6 illustrates a method 70 of controlling particulates such as produced sand in a borehole. The method is performed in conjunction with a fluid control device or tool such as the screen assembly 20. The method 70 includes one or more stages 71-75. In one embodiment, the method 70 includes the execution of all of stages 71-75 in the order described. However, certain stages may be omitted, stages may be added, or the order of the stages changed. Although the method 70 is described in conjunction with the screen assembly 20, the method can be utilized in conjunction with any suitable fluid control device or system.

In the first stage 71, at fluid control device or apparatus, such as the screen assembly 20 is prepared for deployment. A porous thermoplastic medium as described herein (e.g., the medium or conformable sleeve 42) is disposed on a support structure, and is compacted from an initial shape to a smaller diameter shape (a compacted or run-in shape) at a temperature above the Tg of the medium.

In the second stage 72, the device is deployed to a subterranean environment via a borehole. For example, the screen assembly 20 in the compacted state is deployed in the borehole 14 to a selected location, such as a production zone. At this stage, the Tg of the porous medium is above the temperature at the selected subterranean location.

In the third stage 73, the porous medium is activated to cause the medium to expand into an expanded state, in which some or all of the initial or run-in shape is recovered. For example, the screen assembly 20 and the medium 42 is activated by injecting an activation fluid, such as a water-brine or oil-based liquid, to lower the Tg. The activation fluid causes the Tg of the medium 42 to fall below the downhole temperature, which causes the medium 42 to expand and conform to a surface of the borehole 14.

In the fourth stage 74, production is commenced, and fluid from the subterranean region is drawn through the porous medium. For example, fluid from the formation 16 is drawn through the medium 42 to filter out sand and other undesirable material. In the fifth stage 75, production fluid including fluid from the formation is produced at the surface.

Embodiments described herein provide an effective means to control sand and prevent undesired materials from entering a production string or being produced. The devices described herein can be configured to operate effectively at a wide range of temperatures, including temperatures higher than those at which conventional sand control devices operate. The various porous configurations of the thermoplastic polymers provides for a shape memory effect that allows for compaction and expansion at such high temperatures. These configurations allow for the use of the thermoplastic polymers described herein, which can have more robust properties and resistance to high temperatures than traditional or conventional shape memory polymers (SMP).

Set forth below are some embodiments of the foregoing disclosure:

Embodiment 1: A fluid control device comprising: a support structure configured to be deployed in a borehole; a filtration component disposed at the support structure, the filtration component including a porous medium made from a thermoplastic polymer material, the porous medium including an open cell foam, the porous medium having a porosity selected to cause the porous medium to exhibit shape memory behavior, the porous medium configured to be compacted from an initial shape to a compacted shape, deployed in the borehole, and subsequently expanded due to a downhole temperature to conform to a surface of the borehole.

Embodiment 2: The device of any prior embodiment, wherein the fluid control device is configured as a screen assembly, the screen assembly configured to filter undesirable material including sand from fluid entering the borehole from a subterranean region, the support structure including a tubular having a fluid conduit defined therein, the porous medium being at least one layer disposed on an outer surface of the tubular and at least partially surrounding the tubular.

Embodiment 3: The device of any prior embodiment, wherein the porous medium is configured to have a glass transition temperature that is greater than a subterranean temperature.

Embodiment 4: The device of any prior embodiment, wherein the glass transition temperature is greater than about 100 degrees C.

Embodiment 5: The device of any prior embodiment, wherein the porosity is at least about 40 percent.

Embodiment 6: The device of any prior embodiment, wherein the porous medium is configured to be activated by injecting an activation fluid into the borehole to the porous medium, the activation fluid configured to reduce the glass transition temperature to below the subterranean temperature.

Embodiment 7: The device of any prior embodiment, wherein the thermoplastic polymer material includes polytetrafluoroethylene (PTFE).

Embodiment 8: The device of any prior embodiment, wherein the thermoplastic polymer material includes a cross-linked thermoplastic polymer.

Embodiment 9: The device of any prior embodiment, wherein the thermoplastic material includes cross-linked PTFE.

Embodiment 10: The device of any prior embodiment, further comprising at least one additional filtration layer disposed at the tubular.

Embodiment 11: A fluid control method comprising: deploying a fluid control device in a borehole, the fluid control device including a support structure and a filtration component disposed at the support structure, the filtration component including a porous medium made from a thermoplastic polymer material, the porous medium including an open cell foam, the porous medium having a porosity selected to cause the porous medium to exhibit shape memory behavior, wherein the fluid control device is deployed when the porous medium is in a compacted shape; activating the porous medium to cause the porous medium to expand due to a downhole temperature, and conform to a surface of the borehole; and flowing a fluid through the porous medium and filtering undesirable material from the fluid.

Embodiment 12: The method of any prior embodiment, wherein the fluid control device is configured as a screen assembly, the support structure includes a tubular having a fluid conduit defined therein, the porous medium includes at least one layer disposed on an outer surface of the tubular and at least partially surrounding the tubular, and the undesirable material includes sand from the subterranean region.

Embodiment 13: The method of any prior embodiment, wherein the porous medium has a glass transition temperature that is greater than a subterranean temperature.

Embodiment 14: The method of any prior embodiment, wherein the glass transition temperature is greater than about 100 degrees C.

Embodiment 15: The method of any prior embodiment, wherein the porosity is at least about 40 percent.

Embodiment 16: The method of any prior embodiment, wherein activating the porous medium includes injecting an activation fluid into the borehole to the porous medium, the activation fluid reducing the glass transition temperature to below the subterranean temperature.

Embodiment 17: The method of any prior embodiment, wherein the thermoplastic polymer material includes polytetrafluoroethylene (PTFE).

Embodiment 18: The method of any prior embodiment, wherein the thermoplastic polymer material includes a cross-linked thermoplastic polymer.

Embodiment 19: The method of any prior embodiment, wherein the thermoplastic material includes cross-linked PTFE.

Embodiment 20: The method of any prior embodiment, wherein the fluid control device includes at least one additional filtration layer disposed at the tubular.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fluid control device comprising:
a support structure configured to be deployed in a borehole;
a filtration component disposed at the support structure, the filtration component including a porous medium made from a thermoplastic polymer material having a resistance to downhole temperatures of at least about 100 degrees Celsius, the porous medium including an open cell foam, the porous medium having a selected porosity, the selected porosity providing a shape memory effect that causes the thermoplastic polymer material to exhibit shape memory behavior, the porous medium configured to be compacted from an initial shape to a compacted shape, deployed in the borehole, and subsequently expanded due to a downhole temperature to conform to a surface of the borehole, wherein the thermoplastic polymer does not exhibit the shape memory behavior when a porosity of the thermoplastic polymer is less than the selected porosity.

2. The device of claim 1, wherein the fluid control device is configured as a screen assembly, the screen assembly configured to filter undesirable material including sand from fluid entering the borehole from a subterranean region, the support structure including a tubular having a fluid conduit defined therein, the porous medium being at least one layer disposed on an outer surface of the tubular and at least partially surrounding the tubular.

3. The device of claim 2, further comprising at least one additional filtration layer disposed at the tubular.

4. The device of claim 1, wherein the porous medium is configured to have a glass transition temperature that is greater than about 100 degrees C.

5. The device of claim 4, wherein the porous medium is configured to be activated by injecting an activation fluid into the borehole to the porous medium, the activation fluid configured to reduce the glass transition temperature to below the subterranean temperature.

6. The device of claim 1, wherein the thermoplastic polymer material has a resistance to downhole temperatures of at least 120 degrees Celsius.

7. The device of claim 1, wherein the selected porosity is at least about 40%.

8. The device of claim 1, wherein the thermoplastic polymer material includes polytetrafluoroethylene (PTFE), and the selected porosity is at least about 55 percent.

9. The device of claim 1, wherein the thermoplastic polymer material includes a cross-linked thermoplastic polymer.

10. The device of claim 9, wherein the thermoplastic material includes cross-linked PTFE.

11. A fluid control method comprising:
deploying a fluid control device in a borehole, the fluid control device including a support structure and a filtration component disposed at the support structure, the filtration component including a porous medium made from a thermoplastic polymer material having a resistance to downhole temperatures of at least 100 degrees Celsius, the porous medium including an open cell foam, the porous medium having a selected porosity, the selected porosity providing a shape memory effect that causes the thermoplastic polymer material to exhibit shape memory behavior, wherein the fluid control device is deployed when the porous medium is in a compacted shape, and wherein the thermoplastic polymer does not exhibit the shape memory behavior when a porosity of the thermoplastic polymer is less than the selected porosity;
activating the porous medium to cause the porous medium to expand due to a downhole temperature, and conform to a surface of the borehole; and
flowing a fluid through the porous medium and filtering undesirable material from the fluid.

12. The method of claim 11, wherein the fluid control device is configured as a screen assembly, the support structure includes a tubular having a fluid conduit defined therein, the porous medium includes at least one layer disposed on an outer surface of the tubular and at least partially surrounding the tubular, and the undesirable material includes sand from the subterranean region.

13. The method of claim 12, wherein the fluid control device includes at least one additional filtration layer disposed at the tubular.

14. The method of claim 11, wherein the porous medium has a glass transition temperature that is greater than about 100 degrees C.

15. The method of claim 14, wherein the thermoplastic polymer material has a resistance to downhole temperatures of at least 120 degrees Celsius.

16. The method of claim 14, wherein activating the porous medium includes injecting an activation fluid into the borehole to the porous medium, the activation fluid reducing the glass transition temperature to below the subterranean temperature.

17. The method of claim 11, wherein the selected porosity is at least about 40%.

18. The method of claim 11, wherein the thermoplastic polymer material includes polytetrafluoroethylene (PTFE).

19. The method of claim 11, wherein the thermoplastic polymer material includes a cross-linked thermoplastic polymer.

20. The method of claim 19, wherein the thermoplastic material includes cross-linked PTFE.

* * * * *